Nov. 2, 1937.  A. E. KILPELA  2,097,569
AUTOMATIC TRANSMISSION
Filed Nov. 4, 1933  3 Sheets-Sheet 1
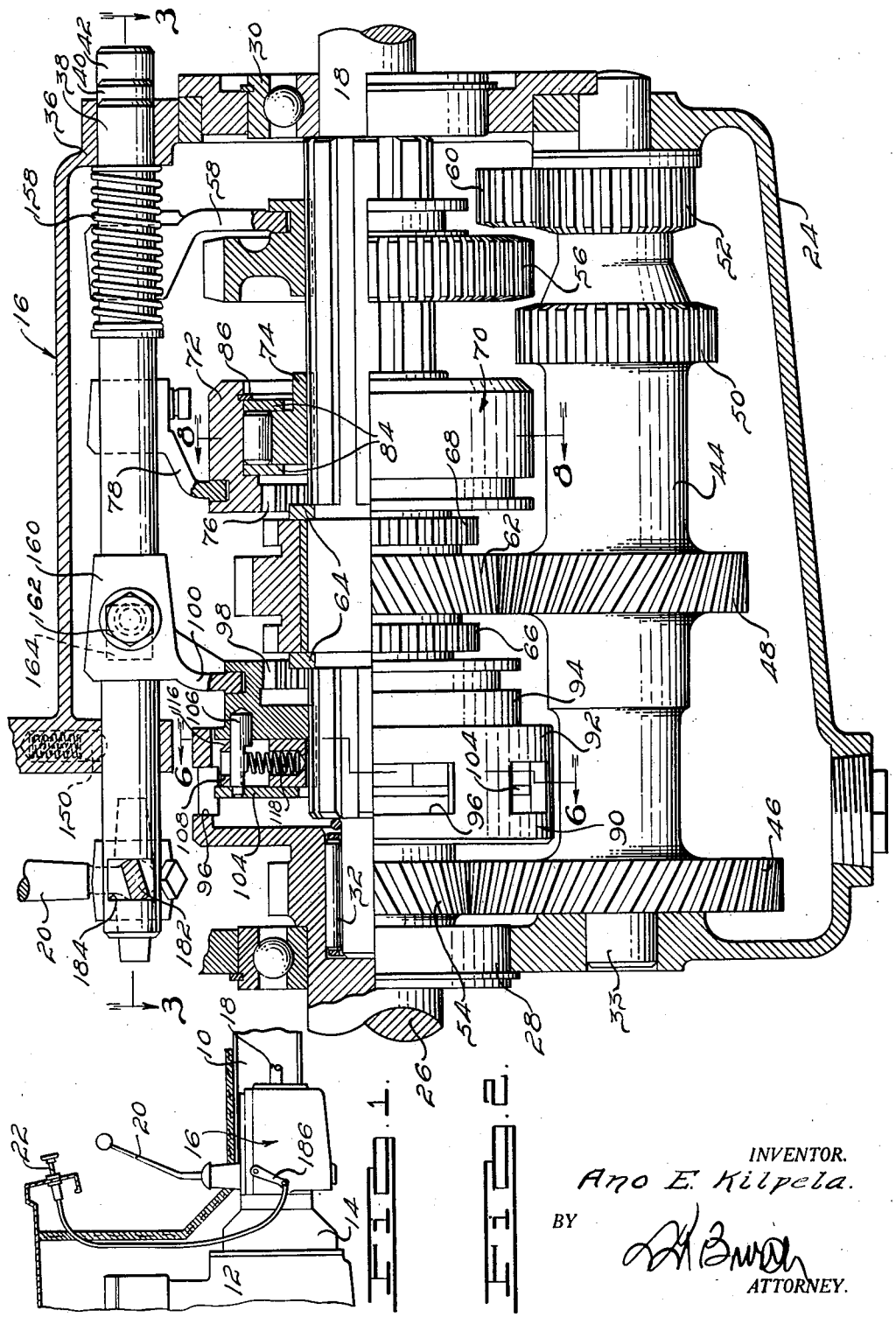
INVENTOR.
Ano E. Kilpela.
BY
ATTORNEY.

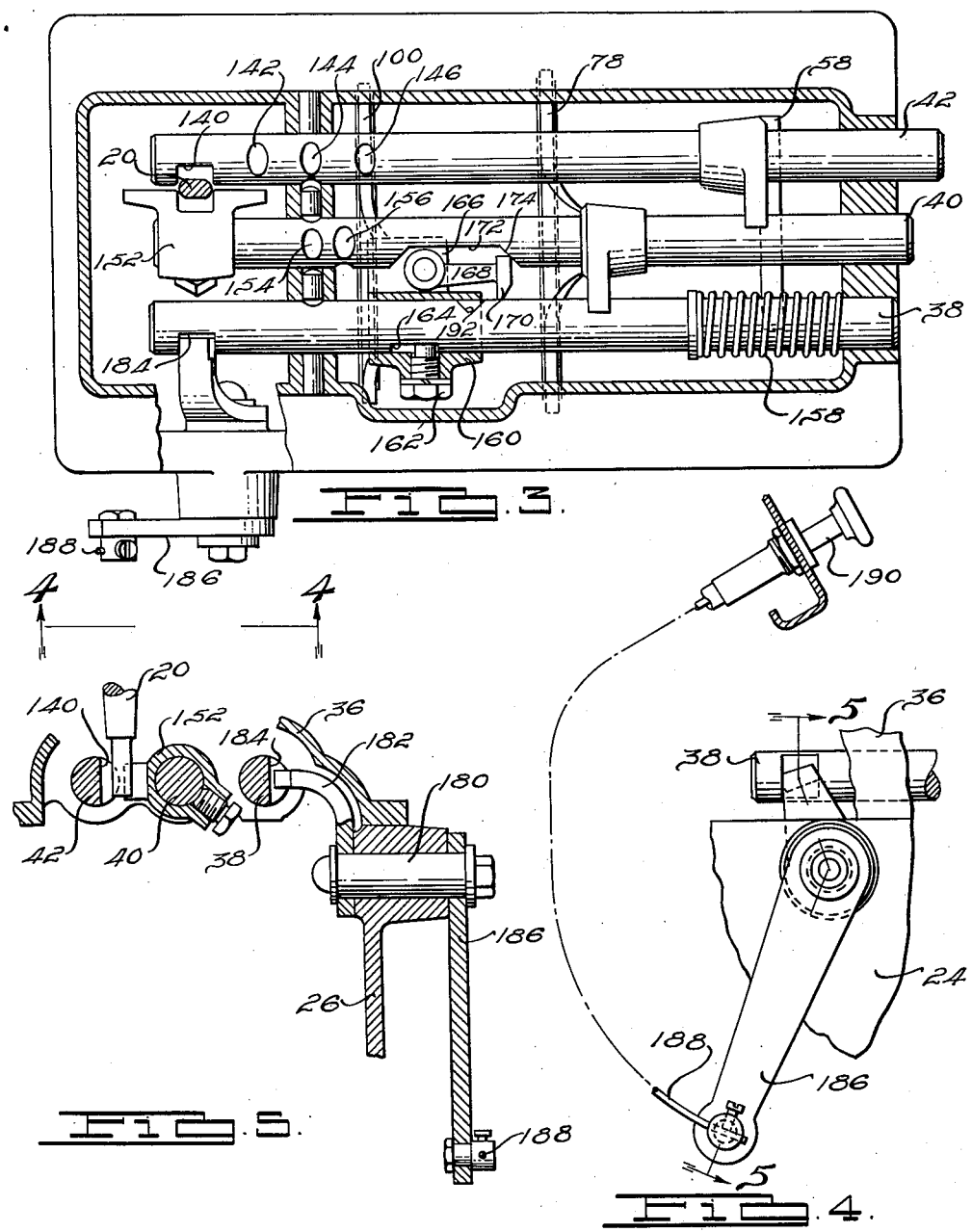

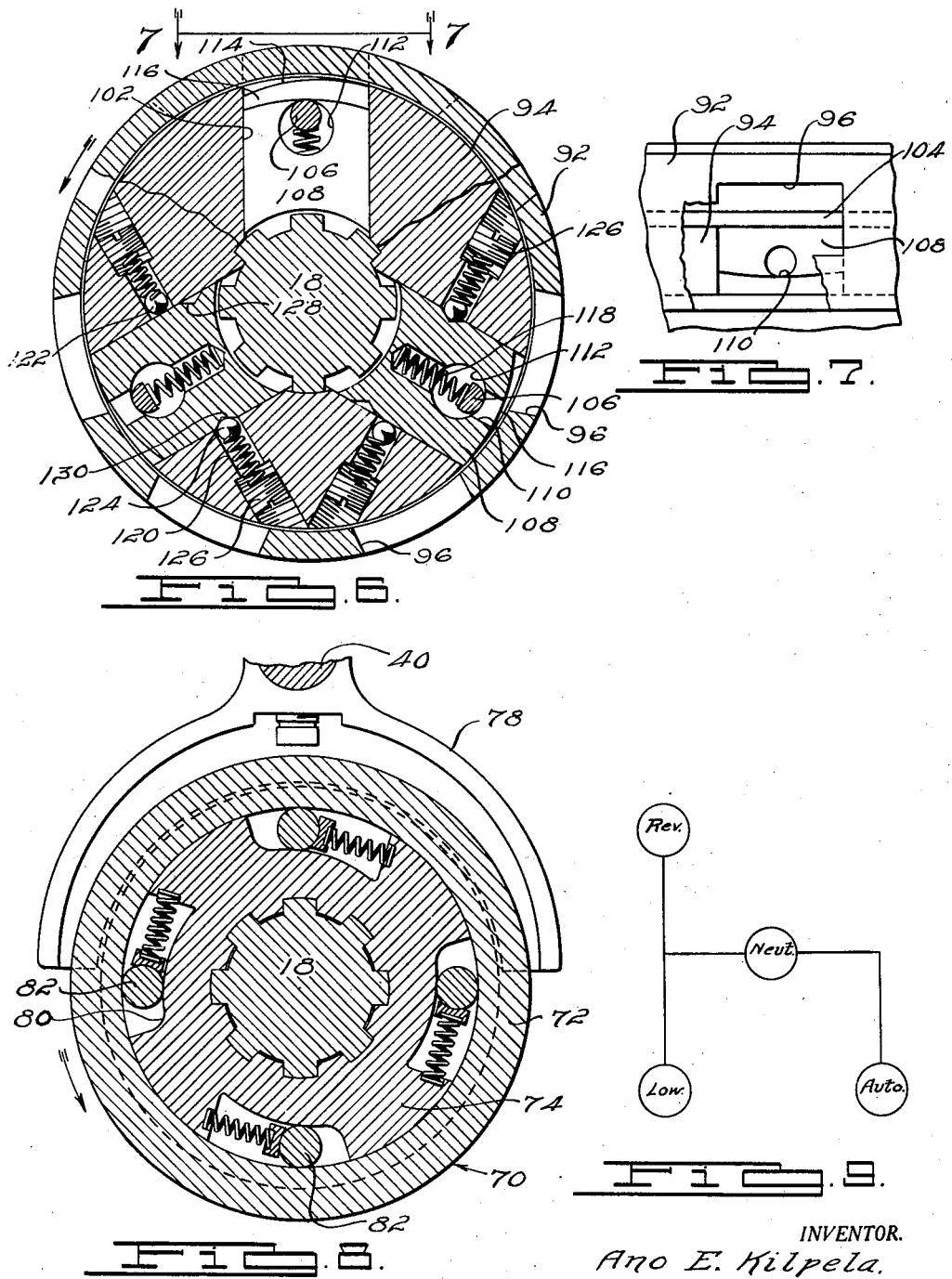

Patented Nov. 2, 1937

2,097,569

UNITED STATES PATENT OFFICE 2,097,569

AUTOMATIC TRANSMISSION

Ano E. Kilpela, Detroit, Mich., assignor, by mesne assignments, to Borg-Warner Corporation, a corporation of Illinois Application November 4, 1933, Serial No. 696,632

19 Claims. (Cl. 74—336)

This invention, in general, relates to improvements in transmissions or variable speed power transmitting mechanisms operable responsive to predetermined conditions of operation of the vehicle in which the transmission is incorporated for automatically effecting a change in the driving or gear ratio and in particular, to manually controlled auxiliary means for effecting a change in the gear ratio without regard to the conditions of operation of the vehicle in which the transmission may be incorporated.

Heretofore, it has been proposed to incorporate automatic speed change devices in transmissions for the purpose of effecting automatic changes in the driving or gear ratio responsive to various factors or conditions of operation of the vehicle in which the device has been incorporated. This has resulted in reducing the direct control which the operator of a vehicle may exercise over the operation thereof and has rendered the vehicle less adaptable for unusual driving conditions outside the range of conditions or factors to which the automatic speed changing device is responsive.

For the purpose of enabling the operator of a vehicle in which an automatic speed changing device, particularly of the type illustrated, has been incorporated, to exercise direct control over the operation of the vehicle through the medium of the transmission and associated parts, I have provided manipulative, auxiliary means operable for changing the gear or driving ratio at any desired time without regard to the particular condition of operation of the vehicle and which has the effect of rendering inoperative the automatic speed changing device.

An object of the invention, therefore, is to provide in an automatically variable speed power transmitting mechanism, auxiliary means optionally operable for locking out the automatic speed changing device and for placing the changing of the gear ratio directly under the control of the operator of the vehicle.

Another object of my invention is the provision of a variable speed power transmitting mechanism, which may be operable responsive to predetermined conditions of operation of the vehicle in which the mechanism has been incorporated, for automatically effecting a change in the driving ratio, or which may be manually operated by the operator of the vehicle without regard to the condition of operation thereof.

Other objects and advantages of my invention will be apparent from a reading of the following specification, in conjunction with a study of the accompanying drawings, of which there are three sheets, and in which:

Fig. 1 is a diagrammatic view of a portion of an automotive vehicle in which a device embodying my invention has been incorporated;

Fig. 2 is a longitudinal view of a variable speed power transmitting mechanism partly in section and illustrating a preferred embodiment of the invention;

Fig. 3 is a top plan view taken generally on the line 3—3 of Fig. 2 and illustrating the various linkages and connections for manually shifting the internal parts of the transmission illustrated in Fig. 2;

Fig. 4 is a side elevational view on the line 4—4 of Fig. 3;

Fig. 5 is a sectional view of Fig. 4 on the line 5—5 thereof;

Fig. 6 is a cross sectional view of the automatic speed changing device and particularly on line 6—6 of Fig. 2;

Fig. 7 is a detail view of Fig. 6 on the line 7—7 thereof;

Fig. 8 is a cross sectional view of the overrunning clutch and particularly on the line 8—8 of Fig. 2; and Fig. 9 is a diagrammatic view of the handle positions of the shift lever.

Referring now particularly to Fig. 1, there is shown, diagrammatically, a portion of an automotive vehicle having a main frame 10 providing a support for an engine 12, a housing-enclosed clutch 14, a transmission mechanism indicated generally at 16, and a driven shaft 18 adapted to be suitably connected to the road wheels of the vehicle. A shift lever 20 providing the main control for the transmission and a dash control 22 providing an auxiliary control for the transmission are provided in the operator's compartment of the vehicle for manipulation by the operator thereof.

The transmission indicated generally at 16 comprises a casing 24 providing a housing for the operating mechanism of the transmission and a support for a driving shaft 26 journaled in a bearing 28 suitably secured in an aperture in the forward wall of the casing 24, a driven shaft 18 journaled at its rearward end in a bearing 30 suitably secured in an aperture in the rearward wall of the transmission casing 24, and at its forward end in a roller bearing 32 secured in a counterbore provided in the posterior end of the driving shaft 26, a countershaft 33 secured against rotation and to the forward and rearward walls of the casing 24, and a cover plate 36 providing a closure for the casing 24 and a support for the shift lever 20 and a plurality of yoke rods 38, 40 and 42 slidably secured with respect to the cover 36 and adapted to provide a medium for connecting the shift lever 20 to the shiftable parts of the transmission.

The countershaft 32 is adapted freely to support thereon a cluster of gears 44 comprising helical gears 46 and 48 and gears 50 and 52. The helical gear 46 is adapted constantly to mesh with a helical gear 54 which may be formed on a portion of the driving shaft 26 which projects within the transmission casing 24 and which is adapted to rotate the cluster of gears as a unit when the driving shaft 26 is connected to the engine through the housing-enclosed clutch 14. An externally toothed gear 56 is slidably splined to the driven shaft 18 adjacent the rearward end thereof and is adapted to be shifted axially by a fork 58 fixedly carried by the yoke rod 42 for the purpose of meshing with gear 50 to provide a low speed driving connection between the driving and the driven shafts and through the intermediary of helical gears 54, 46, gear 50 and gear 56, which is splined to the driven shaft.

Movement of gear 56 to the right, looking at Fig. 2, will mesh the teeth thereof with those of an idler gear 60 which is in constant mesh with gear 52 of the cluster of gears, for the purpose of providing a reverse driving connection between the driving and the driven shafts and through the intermediary of helical gears 54 and 46 and gears 52, 60 and 56, the latter of which is splined to the driven shaft.

An intermediate speed helical gear 62 is rotatably mounted upon the driven shaft 18 and is secured against lateral displacement thereon by thrust washers 64 suitably secured to the driven shaft 18. The helical gear 62 is adapted constantly to mesh with helical gear 48 of the cluster of gears and is provided with external sets of teeth 66 and 68 at opposite ends thereof, which comprise, respectively, positive and free wheeling intermediate speed clutch members.

A clutch unit, indicated generally at 70, is slidably splined to the driven shaft 18 between the helical gear 62 and the slidable gear 56 and comprises a clutch driving member 72 and a clutch driven member 74, the latter of which is slidably splined to the driven shaft and is adapted to support the driving member 72, which is provided with an internal set of teeth 76 which are adapted to mesh with teeth 68 provided on the intermediate speed helical gear 62. Shift fork 78 fixedly secured to the yoke rod 40 is provided for shifting the clutch unit 70, for the purpose of meshing teeth 76 thereof with teeth 68 provided on the intermediate speed helical gear, for the purpose of providing a one-way drive between the driving and the driven shafts and through the intermediary of helical gears 54, 46, 48 and 62 and clutch unit 70 which is splined to the driven shaft 18.

Reference may now be had to Fig. 8, where the constructional details of the clutch unit 70 are illustrated. The driven member 74 of the clutch unit 70 is provided with a plurality of eccentric raceways 80 circumferentially disposed about the periphery of the driven member 74 and contiguous to the inner surface of the driving member 72. Each of the raceways 80 is provided with a spring pressed roller 82 which is adapted to be forced into the narrower end of the raceway for the purpose of rotating the driven member 74 with the driving member 72, when the driving member tends to overrun the driven member in the direction indicated by the arrow shown in Fig. 8, but which rollers are adapted to be forced out of the narrower ends of the raceways 80 whenever the driven member 74 overruns the driving member 72 in the direction indicated by the arrow shown in Fig. 8, so that a one-way drive is provided between the driving and the driven members. Thus, when the teeth 76 of the clutch unit 70 are in mesh with the teeth 68 on the intermediate speed helical gear 62, the driven member 74 and driven shaft 18 will always rotate as fast as the helical gear 62, but when the speed of rotation thereof is reduced, the driven shaft 18 will rotate at a greater rate of speed than the intermediate speed helical gear 62. Thrust washers 84 and snap ring 86 are provided for holding the rollers 82 in position between the adjacent surfaces between the driving and driven members.

An automatic speed changing device or clutch unit, indicated generally at 90, is disposed between the helical gears 54 and 62 and comprises relatively movable members 92 and 94. The member 92 comprises a drum-shaped shell and may be formed on the posterior end of the driving shaft 26 and is adapted to provide the driving member of the clutch. The driving member 92 of the clutch unit 90 is provided with a plurality of circumferentially disposed slots 96.

The driven member 94 of the clutch unit 90 comprises a core slidably splined to the forward end of the driven shaft 18, and which is provided with an internal set of teeth 98 which are adapted to mesh with the external set of teeth 66 provided on the intermediate speed helical gear 62 and, for the purpose of providing a positive or two-way drive between the driving and the driven shafts and through the intermediary of helical gears 54, 46, 48, 62 and core or driven member 94 of the clutch unit 90.

A shift fork 100, carried by the yoke rod 38 so as to be capable of slight lateral movement relative thereto, is provided for axially moving the driven member 94 of the clutch unit 90. The forward face of the driven member 94 is provided with a plurality of radially extending grooves or slots 102 which are covered by a face plate 104 secured to the core 94 by means of pins 106. A radially movable bolt 108 is slidably disposed in each of the grooves or slots 102 and is provided with a longitudinally extending bore 110, a transverse bore 112, an eccentric circumferential face 114 and a beveled edge 116. Pins 106 are adapted to extend through bores 112 and to confine, between a flatted portion of the pin and the end of the bore 110, a spring 118 for resisting radial outward movement of the bolt 108 responsive to centrifugal force resulting from rotation of the driven member or core 94 which is adapted to rotate with the driven shaft 18. When the driven member 94 is in the position shown in Fig. 2, movement of the bolt 108 outwardly will be prevented because the path of rotation of the bolt does not coincide with that of the slots 96.

The driven member or core 94 is provided with a plurality of bores 120 which may be disposed along the line of a chord of the circle formed by the outline of the core 94 and one of which intercepts and lies at right angles with respect to each of the slots or grooves 102. The portions of the bore 120 on each side of the slots 102 are provided with spring pressed poppets 122 and 124, each of which is backed by an adjustable plug such as 126, for the purpose of varying the force with which the poppets press against the sides of the bolt 108. The bolt 108 is provided with offset notches 128 and 130 which are adapted to be engaged by the poppets 122 and 124, respectively. As shown in Fig. 6, the poppets 124 are in engagement with the notches 130. When the bolt 108 is in its outward or projected position, the poppet 122 will be in engagement with the notch 128. The spring pressed poppet 124 engaging in the notch 130 has the effect of increasing the inertia of the bolt 108 and tends to resist the outward movement of the same, and to that end cooperate with the spring 118 in resisting the centrifugal force resulting from rotation of the driven member 94.

Rotation of the core or driven member 94 at or above a predetermined rate will, however, move or tend to move the bolt 108 outwardly. The speed at which the bolt 108 will tend to move outwardly will be determined by the force of the spring 118 and the force with which the poppet 124 engages in the notch 130. It will thus be apparent that the spring pressed poppet 124 provides means for varying within limits, the amount of centrifugal force required to move the bolt 108 outwardly. On account of the shifting of the center of gravity of the bolt 108 away from the axis of rotation when the same is moved to its outward position, a lower speed of rotation of the driven member or core 94 than that necessary to move the bolt outward will be sufficient to hold the bolt in its outward position.

The bolt normally, therefore, will return to its retracted position at a lower rate of speed than that at which it would move outwardly. The spring pressed poppet 122 engaging in the notch 128 has the effect of further increasing the differential between the speeds at which the bolt moves outwardly and inwardly and may be adjusted for the purpose of holding the bolt in its outward position until practically any predetermined speed is attained. The spring 118 operates to move the bolt inwardly, and to that end must overcome the centrifugal force of the bolt 108 and the thrust force of the poppet 122.

It will be noted that more slots are provided in the driving member 92 than bolts are provided in the driven member 94, and that the number of the slots 96 is not a multiple of the number of the bolts 108. For this reason, only one of the bolts 108 at any one time will line up with any one of the slots 96 at any one time, and therefore, only one of the bolts 108 can be in a projected position at any one time. The eccentric circumferential faces 114 of the bolts 108 are adapted to cause the bolts 108 to "jump" the slots 96 as long as the driving member 92 is rotating at a rate of speed substantially in excess of that of the driven member 94.

When, however, the rate of rotation of the driving member 92 has been relatively decelerated to aproximately that of the driven member 94, one of the bolts 108 will be projected outwardly into one of the slots 96, assuming that the speed of rotation of the driven member 94 is at or above that necessary to move the bolts 108 outwardly and that the core 94 has been moved to the left, looking at Fig. 2, for the purpose of making the path of rotation of the slots 96 and the bolts 108 coincide. Movement of one of the bolts into one of the slots will serve to lock the driving and driven members together to prevent further deceleration of the speed of the driving member 92 and for the purpose of providing a direct drive between the driving and the driven shafts through the intermediary of the clutch unit 90. As long as there is any torque between the bolt 108, which is in its projected position, and the driving member 92 of the clutch, the bolt 108 will remain in its projected position, even though the speed of rotation of the driven member 94 may be below that at which the bolt normally would move inwardly. However, as soon as the torque between the driving member 92 and the projected bolt 108 is released and the speed of rotation of the driven member 94 is below that necessary to hold the bolt 108 in its projected or outward position, the spring 118 will move the bolt inwardly, for the purpose of disconnecting the members 92 and 94 of the clutch unit 90.

The beveled edge 116 is provided on the bolt 108 for the purpose of breaking the driving connection between the driving member 92 and the driven member 94 when the speed of rotation of the driven member is above that at which the bolt 108 normally would move inwardly. The beveled edge 116 is adapted to bear against an edge of the driving member 92 provided by the slot 96 and, when the core 94 is moved to the right, (looking at Fig. 2), is adapted to cam the bolt 108 inwardly to its retracted position, whereupon the driving connection between the driving member 92 and the driven member 94 will be broken, and the bolt 108 will be moved out of the path of rotation of the slots 96. In this position the bolt 108 will remain, regardless of the speed of rotation of the driven shaft 18.

For the purpose of manually controlling the speed changing mechanism, I have provided the shift lever 20, which, through the medium of the yoke rods 38, 40 and 42, and the shift forks carried thereby, is adapted to move the shiftable parts of the transmission mechanism for the purpose of effecting various gear ratios. The yoke rod 42 is provided with a cutaway portion 140 which is adapted to receive the bottom end of the shift lever 20 for the purpose of moving the yoke rod 42 to the right, looking at Fig. 3, to effect a reverse drive between the driving and the driven shafts and for moving the shift lever 22 to the left, looking at Fig. 3, to effect a low speed drive between the driving and the driven shafts. The yoke rod 42 is provided with a plurality of notches 142, 144 and 146 on its upper side thereof and corresponding respectively with the reverse, neutral and low speed positions of the yoke rod 42. The notches are adapted to be engaged by a spring pressed poppet such as 150 for the purpose of locating the various gear positions and for holding the yoke rod 42 against undesirable displacement.

The yoke rod 40 is provided with a gate 152 at the forward end thereof which is adapted to be engaged by the lower end of the shift lever 20 for the purpose of moving the yoke rod 40 to the left, looking at Fig. 3, to the automatic position as indicated in Fig. 9.

The yoke rod 40, on the upper side thereof, is provided with a plurality of notches 154 and 156, corresponding respectively with the neutral and automatic position of the yoke rod 40 and which are adapted to be engaged by a spring pressed poppet 150 for the purpose of locating the various gear positions. Yoke rod 38 is biased to the left, looking at Fig. 3, by a spring 158 and carries a collar 160 slidably mounted on the yoke rod, but limited in the extent of relative movement by a bolt 162, the end of which is adapted to engage shoulders formed by a cutaway portion 164 provided in one side of the yoke rod 38. The collar 160 carries the shift fork 100, which is provided for moving the driven member 94 of the clutch unit 90, and is provided with a laterally extending arm 166 upon which is mounted a trigger 168 having a head 170. The yoke rod 40 is provided with a cutaway portion 172 on one side thereof, which provides clearance between the yoke rods 38 and 40, so that the head 170 of the trigger may ride upon one side of the yoke rod 38 and also be in engagement with a beveled shoulder 174 provided on the yoke rod 40 by the cutaway portion 172.

Movement of the handle of the shift lever 20 to automatic position, as indicated in Fig. 9, will cause the lower end of the shift lever to engage the gate 152 provided on the yoke rod 40 and move the same to the left, looking at Fig. 3, to a position where the notch 156 will be engaged by the spring pressed poppet 150. Leftward movement of the yoke rod 40 from the position in which it is shown in Fig. 3 will, through the engagement of the beveled shoulder 174 with the head 170 at the trigger, move the collar 160 along the yoke rod 38 to a position where the end of the bolt 162 will engage the shoulder formed at the opposite end of notch 164 and by means of the shift fork 100 carried by the collar 160, will move the driven member 94 of the clutch unit 90 to a position where the bolts 108 will lie in the path of rotation of the slots 96. Since the shift fork 78 is carried by and rigidly secured to the yoke rod 40, the clutch unit 70 will be moved to the left along with the driven member 94 of the clutch unit 90, to a position where the teeth 76 of the driving member 72 of the clutch unit 70 will mesh with the teeth 68 provided on the intermediate speed helical gear 62, for providing an intermediate speed free wheel drive through the intermediary of helical gears 54, 46, 48, 62 and clutch unit 70, which is splined into the driven shaft 18.

The drive will continue through the clutch unit 70 until the speed of rotation of the driven shaft 18 tends to move the bolts outwardly and until the speed of rotation of the driving member 92 is decelerated to approximately that of the driven member 94. When the speed of rotation of the driving and driven members of the clutch unit 90 is approximately synchronized, such as by a temporary closing of the engine throttle, one of the bolts 108 will be projected into one of the slots 96, for the purpose of locking the driving and driven members of the clutch unit together for rotation, and the drive will then be through the intermediary of the clutch unit 90.

When the drive between the shafts is through the intermediary of the clutch 90, the driven member 74 of the clutch unit 70 will overrun the driving member thereof and will continue to do so until a subsequent deceleration of the speed of rotation of the driven shaft permits the bolt 108 which is locking the driving and driven members of the clutch unit 90 together, to be moved inwardly by the spring 118. Thus, when the transmission is placed in automatic gear position, the drive between the shafts will be an intermediate speed free wheeling drive and will continue as such even after the speed of rotation of the driven shaft has passed the speed at which the bolts are movable outwardly until the throttle governing the speed of the engine is temporarily closed to permit one of the bolts 108 to be projected into one of the slots 96. Once the automatic change from an intermediate speed to a direct drive is made, the drive will continue to be a direct high speed drive until the speed of rotation of the driven shaft falls below a predetermined rate, when the bolt 108 which connects the driving and driven members of the clutch unit 90 will be moved by the spring 118 to its inward position. The bolt 108 will remain in its projected position, however, as long as there is any torque between the driving member 92 of the clutch unit 90 and the bolt 108. If the deceleration of the speed of the vehicle is gradual, the bolt 108 which connects the driving and driven members of the clutch unit 90 will collapse at approximately the predetermined speed because the speed of the engine relative to that of the vehicle has a tendency to oscillate.

For the purpose of enabling the operator of a vehicle in which an automatic speed changing device, particularly of the type illustrated, has been incorporated, to exercise a direct control over the operation of a vehicle through the medium of the transmission and associated parts, I have provided manipulative auxiliary means operable for changing the driving ratio at any desired time without regard to the particular condition of operation of the vehicle and which has the effect of rendering inoperable, the automatic speed changing device. I have, therefore, provided means which are operable for connecting the road wheels of the vehicle to the engine in both positive and free wheeling intermediate speed drives, but in which no automatic change in the gear ratio will be effected.

To that end, I have provided a control operable at will by the operator of the vehicle and mounted upon the dash board of the driver's compartment. The control 190 may, however, be connected to a floor button if desired. A shaft 180 is rockably mounted in the side wall of the transmission casing, and the end which projects within the casing carries a lever 182, the free end of which engages a notch 184 provided in the forward end of the yoke rod 38.

A lever 186 is suitably secured to the shaft 180 without the transmission and has connected to the free end thereof, a Bowden wire 188 which leads to the dash control 190. Pulling out of the dash control to its first position is adapted to move the yoke rod 38 to the right. When the collar 160 and the trigger 168 carried thereby were moved to the left, looking at Fig. 2, when the transmission was placed in automatic position, the head 170 of the trigger was moved along the yoke rod 38 to a position opposite a notch 192 therein. It will be remembered that the end of the bolt 162 was also moved to the end of the cutaway portion 164 opposite from that in which it is shown in Fig. 3 of the drawings. When the head 170 of the trigger 168 is opposite the notch 192, the head 170 may drop into the same, which will permit the opposite end of the head to clear the yoke rod 40.

Pulling out of the dash control 190 to the first position will, through the intermediary of the Bowden wire 188, lever 186, shaft 180, lever 182, yoke rod 38 and collar 160, move the shift fork 100 to the right, thereby carrying driven member 94 of the clutch unit 90 with it to a position where the bolts 108 will be out of the path of rotation of the slots 96 and therefore not in a position for connecting the driving and driven members of the clutch 90 for rotation together. Whether the bolts are in the retracted position or one of the bolts 108 is in its projected position, the driven member 94 of the clutch unit 90 will be moved to the right by manipulation of the dash control 190, to a position such as that shown in Fig. 2 of the drawings, whereupon the clutch unit 70 will become operative to drive the driven shaft 18 since it still will be connected to the intermediate speed helical gear 62.

The clutch unit 94 may be held in its position shown before the shift lever is put into automatic position by pulling out the dash control 190, whereupon the transmission will remain in free wheeling intermediate speed ratio.

Pulling out of the dash control 190 to its second position will move the driven member 94 of the clutch unit 90 further to the right to a position where the teeth 98 internally provided on the driven member 94 will mesh with the external teeth 66 provided on the forward end of the intermediate speed helical gear 62 for the purpose of effecting a positive intermediate speed drive between the driving and the driven shaft and through the intermediary of helical gears 54, 46, 48 and 62 and driven member 94 of the clutch unit 90 which is slidably splined to the driven shaft 18. It will thus be apparent that the transmission may be locked either in free wheeling intermediate speed drive or a positive intermediate speed drive. Movement of the dash control 190 to its position as shown in Fig. 4 of the drawings, will restore the driven member 94 of the clutch unit 90 to the position from which it was moved.

Thus a means is provided whereby the operator of the vehicle may use the automatic speed changing device for ordinary or normal conditions of driving, and if desired, may cut out the automatic speed changing device and directly effect changes in the gear ratio by means of the dash control.

While several specific embodiments of my invention have been illustrated and described, it must be appreciated that many modifications may be made in the construction thereof without departing from the scope of the invention, and for that reason I do not desire to be limited to any particular form or arrangement except in so far as such limitations are included in the following claims.

I claim:

1. In a device of the class described, the combination of aligned driving and driven shafts, clutch elements carried by each of said shafts, respectively, and rotating at different rates of speed and adapted to be connected to said driven shaft for driving the same, a clutch member slidably splined to said driven shaft and adapted for selectively connecting the same to each of said clutch elements, means carried by said clutch member operable responsive to centrifugal force resulting from rotation thereof for connecting the same to said driving shaft clutch element, said clutch member normally being in a position where said means are ineffective, means affording a one-way driving connection between said shafts whenever said clutch member is in a position where said centrifugal force responsive means may be effective for connecting said driven shaft to said driving shaft clutch element, and shifting means for moving said clutch member into and out of the position where said centrifugal force responsive means may be effective without disconnecting said clutch member from said driven shaft and without regard to the speed of rotation of said clutch member.

2. An automatic speed changing device for a variable speed power transmitting mechanism having driving and driven shafts adapted to be connected in a plurality of drives comprising a clutch element on said driving shaft, a clutch element on said driven shaft and adapted to be connected thereto for driving the same, a pair of clutch members slidably mounted on said driven shaft and adapted to selectively connect the same to said clutch elements to be driven at different rates thereby, speed responsive means carried by one of said clutch members and operable for positively connecting the same to said driving shaft clutch element, and shifting means for moving said last mentioned clutch member into a position where said means may be operative whenever said driven shaft clutch element is connected by the other of said clutch members to the driven shaft for driving the same.

3. An automatic speed changing device for a variable speed power transmitting mechanism having driving and driven shafts and a train of speed reduction gearing providing a one-way drive between said shafts and comprising relatively movable clutch members carried by said shafts for rotation therewith and having speed responsive means carried by one of said clutch members for interconnecting said members, and means for moving one of said clutch members to a position where said speed responsive means are inoperative to connect said members without regard to the speed of said driven shaft and without disconnecting said last mentioned clutch member from its shaft.

4. An automatic speed changing device for a variable speed power transmitting mechanism having driving and driven shafts comprising a fixed clutch member adapted to rotate with one of said shafts, a relatively movable clutch member carried by the other of said shafts and carrying means responsive to variations of the speed of rotation thereof above and below critical rates for effecting and breaking a driving connection between said members, means affording a one-way driving connection between said shafts for initiating the rotation of said driven shaft, and mean for shifting said movable member without regard to the speed of rotation thereof for rendering said means inoperative to effect a connection between said members.

5. An automatic clutch of the class described, comprising driving and driven shafts provided with relatively movable clutch members, means interconnecting said shafts for initially driving said clutch members at different rates, one of said members carrying speed responsive means for positively engaging the other of said members to interconnect said members for effecting a driving connection between said shafts, and means for moving one of said members to render said speed responsive means inoperable for connecting said members and without regard to the speed thereof.

6. An automatic clutch of the class described, comprising driving and driven shafts, a fixed clutch member mounted upon said driving shaft and comprising a cylindrical shell having a fixed stop, a slidable clutch member mounted upon driven shaft, and having a radially movable bolt operable responsive to speed control of the driven shaft for positively engaging said fixed stop on said fixed clutch member to provide a driving connection between said members, means for interconnecting said shafts for initially driving said clutch members at different rates, and means for moving said clutch member to a position where said bolt will underlie said shell and be inoperative to provide a driving connection between said clutch members.

7. A change speed device for a variable speed power transmitting mechanism having driving and driven shafts adapted to be connected in a plurality of drives comprising a fixed clutch member mounted upon one of said shafts, a movable clutch member mounted upon the other of said shafts, means for initially driving said clutch members at different rates, a stop on said fixed clutch member, a radially movable bolt carried by said movable clutch member and operable responsive to centrifugal force resulting from rotation thereof for positively engaging said stop on said fixed clutch member to provide a driving connection between said clutch members, a beveled edge on said bolt cooperable with a portion of said fixed clutch member for moving said bolt inwardly when said movable clutch member is shifted relative to said fixed clutch member for breaking the driving connection between said clutch members, and means for shifting said movable clutch member relative to said fixed clutch member without regard to the rotative condition of said movable clutch member.

8. A clutch unit of the class described, comprising a rotary cylindrical shell having a slot thereon, a rotary core having a radially movable bolt operable responsive to centrifugal force resulting from rotation of said core for projecting into said slot and interconnecting said shell and core thereby, means for driving said core and said shell initially at different rates, said bolt being provided with a beveled circumferential edge adapted to bear against an edge on said shell for camming said bolt out of said slot thereby to disconnect said shell and core, and means for shifting said core relative to said shell for locking said bolt within said shell.

9. A change speed gearing having in combination a driving shaft, a driven shaft, clutch elements rotating at different rates of speed and driven from said driving shaft, correlative clutch members slidably splined to said driven shaft and adapted to be moved into operative relationship with their respective clutch elements, common manipulative means for simultaneously shifting said clutch members into operative relationship with their respective clutch elements, one of said clutch members being adapted to provide a one-way drive between its respective clutch element and said driven shaft, the other of said clutch members being provided with means operable responsive to centrifugal force resulting from rotation of said member for positively locking the same to its respective clutch element to provide a direct two-way drive between said shafts, and auxiliary means for individually moving said last mentioned clutch member for locking said means against operation responsive to centrifugal force.

10. A change speed device for a variable speed power transmitting mechanism having driving and driven shafts adapted to be connected in a plurality of drives comprising a clutch element on said driving shaft, a clutch element on said driven shaft, and connected to be driven from said driving shaft, correlative clutch members slidably splined to said driven shaft and adapted to be moved into operative relationship with their respective clutch elements, one of said clutch members being adapted to provide a one-way drive between its respective clutch element and said driven shaft, the other of said clutch members being provided with means operable responsive to speed control of the driven shaft for determining through which of said clutch elements the driven shaft shall be connected to be driven by the driving shaft, common manipulative means for simultaneously shifting said clutch members into operative relationship with their respective clutch elements, and auxiliary means for shifting one of said clutch members relative to the other of said clutch members for selectively determining through which of said clutch elements the driven shaft shall be connected to be driven by the driving shaft.

11. A change speed device of the class described, comprising aligned driving and driven shafts, relatively movable clutch members carried on said shafts and adapted to provide a driving connection between the same and comprising a cylindrical shell having a slot in the circumferential face thereof and fixedly secured to the driving shaft, an annular member slidably secured to the driven shaft and having a bolt radially movable into and out of said slot in said shell, responsive to speed control of said member to effect and break a driving connection between said member and said shell, means providing an initial driving connection between said shafts for driving said member at a rate different than that of said shell, said bolt being provided with a beveled edge on the face thereof adapted to cooperate with an edge on said shell for moving said bolt out of said slot in said shell and manipulative means for moving said annular member relative to said shell for breaking the driving connection therebetween and for locking said bolt against movement.

12. In a device of the class described, the combination of driving and driven shafts, a fixed clutch member on one of said shafts, a relatively movable clutch member on the other of said shafts and having means operable responsive to variations of the speed of rotation thereof above and below predetermined rates for effecting and breaking a driving connection between said members, a reduced speed gear rotatably mounted on said driven shaft and connected to be driven by said driving shaft, an overrunning clutch shiftable into engagement with said gear to provide a one-way driving connection between the same and said driven shaft, means for simultaneously shifting said overrunning clutch into engagement with said gear and said movable clutch member relative to said fixed clutch member whereby said means may operate to effect a driving connection between said clutch members and auxiliary means operable for moving said movable clutch member without moving said overrunning clutch to render said speed variation responsive means inoperable for connecting said members.

13. In a speed changing device for a variable speed power transmitting mechanism having driving and driven shafts adapted to be connected in a plurality of drives, the combination of relatively movable clutch members carried by said shafts, and speed control responsive means carried by one of said members adapted to interconnect said members for providing a direct drive between said shafts, a reduced speed gear mounted on said driven shaft and a shiftable overrunning clutch for connecting said gear to said shaft to provide a one-way drive therebetween, common means for shifting said overrunning clutch and said clutch member carrying said speed control responsive means into operative position whereby automatic changes in the ratio of the driving connection between said shafts may be effected, auxiliary means for moving said last mentioned clutch member to render said speed control responsive means inoperative, and a lost motion connection between said common means and said auxiliary means.

14. Transmission mechanism having driving and driven shafts, means affording a one-way driving connection between said shafts for initiating the rotation of said driven shaft, relatively movable clutch members operatively associated with said shafts and rotating at different rates during such time as said driven shaft is being driven through said one-way driving connection, one of said clutch members comprising a shell provided with a stop, the other of said clutch members comprising a core and having a bolt engageable with said stop for interconnecting said clutch members, said bolt being movable into and out of engagement with said stop responsive to variations in centrifugal force resulting from the rotation of said clutch member at different rates, and means for relatively moving said clutch members for moving said bolt out of operative engagement with said stop, and operable when said clutch members are rotating at any rate.

15. Transmission mechanism having driving and driven shafts, means affording an initial driving connection between said shafts for initiating the rotation of said driven shaft, and clutch members operatively associated with said shafts and rotating at different rates during such time as said driven shaft is being driven through said initial driving connection, one of said clutch members comprising a shell provided with a stop, the other of said clutch members comprising a core and having a bolt engageable with said stop for interconnecting said clutch members, said bolt being movable into and out of engagement with said stop responsive to variations in centrifugal force resulting from the rotation of said clutch member at different rates, one of said clutch members being axially movable relative to the other of said clutch members for preventing the operative engagement of said bolt with said stop.

16. In a device of the class described the combination of driving and driven shafts, clutch elements carried by each of said shafts, respectively, and rotating at different rates of speed and adapted to be connected to said driven shaft for driving the same, a clutch member slidably splined to said driven shaft and adapted for selectively connecting the same to each of said clutch elements, centrifugal force responsive means carried by said clutch member and operable for connecting the same to said driving shaft clutch element, said centrifugal force responsive means being disconnectable from said driving shaft clutch element upon axial movement of said clutch members for breaking the driving connection therebetween, said clutch member normally being in a position where said centrifugal force responsive means are ineffective, means affording a one-way driving connection between said shafts whenever said clutch member is in a position where said centrifugal force responsive means may be effective for connecting said driven shaft to said driving shaft clutch element, and shifting means for axially moving said clutch member into and out of position where said centrifugal force responsive means may be effective and without regard to the speed of rotation of said clutch member.

17. An automatic speed changing device for a variable speed power transmitting mechanism having driving and driven shafts adapted to be connected in a plurality of drives and comprising a clutch element on said driving shaft, a clutch element on said driven shaft and adapted to be connected thereto for driving the same, a pair of clutch members slidably mounted on said driven shaft and adapted to selectively connect the same to said clutch elements to be driven at different rates thereby, speed responsive means carried by one of said clutch members and operable for positively connecting the same to said driving shaft clutch element, said speed responsive means being disconnectable from said driving shaft clutch element upon axial movement of said one of said clutch members for breaking the driving connection therebetween, and shifting means for moving said last mentioned clutch member into a position where said means may be operative whenever said driven shaft clutch element is connected by the other of said clutch members to the driven shaft for driving the same.

18. An automatic speed changing device for a variable speed power transmitting mechanism having driving and driven shafts and means for providing an initial driving connection between said shafts and relatively movable clutch members carried by said shafts for rotation therewith and having speed responsive means carried by the driven shaft clutch member for interconnecting said members, said speed responsive means being adapted to be rendered inoperative upon axial movement of one of said clutch members for breaking the driving connection therebetween, and means for moving said one of said clutch members, to a position where said speed responsive means are inoperative to connect said members, without regard to the speed of said driven shaft and without disconnecting said last mentioned clutch member from its shaft.

19. In a device of the class described, the combination of driving and driven shafts, a clutch member fixed to rotate with one of said shafts, a relatively movable clutch member carried by the other of said shafts and carrying speed responsive means operable for effecting and breaking a driving connection between said members, means affording an initial driving connection between said shafts, said speed responsive means being adapted to be rendered inoperative upon axial movement of said movable clutch member for breaking the driving connection between said clutch members, and means for shifting said movable member without regard to the speed of rotation thereof for rendering said speed responsive means inoperative.

ANO E. KILPELA.